Nov. 16, 1971  L. E. KELLEY ET AL  3,620,071
TESTING MATERIALS FOR RESILIENCE AND STIFFNESS

Filed June 5, 1970                          2 Sheets-Sheet 1

INVENTORS
LOUIS E. KELLEY
RAYMOND B. ALEXANDER &
EDWARD M. SIOMA

BY *Philip D. Freedman*

ATTORNEY

United States Patent Office 3,620,071
Patented Nov. 16, 1971

3,620,071
TESTING MATERIALS FOR RESILIENCE AND STIFFNESS
Louis E. Kelley, Wyncote, Raymond B. Alexander, Philadelphia, and Edward M. Sioma, Levittown, Pa., assignors to Rohm and Haas Company, Philadelphia, Pa.
Filed June 5, 1970, Ser. No. 43,874
Int. Cl. G01n 3/26
U.S. Cl. 73—99                                      5 Claims

ABSTRACT OF THE DISCLOSURE

Resilience and stiffness of a fabric specimen are determined from measurements of the tensile load that induces a minimum oscillation in a fabric specimen and the time required for an initial complete oscillation cycle at the tensile load. An apparatus useful for making these measurements comprises means for subjecting the specimen to a longitudinal tensile load, means for holding an end of the specimen and means for applying a releasable torque to another end around the longitudinal axis of rotation of the specimen while the specimen is subjected to the tensile load to thereby twist the specimen through an angle of rotation, and means for measuring the time period and oscillation cycles upon release of the specimen from the applied torque. Means are provided for mechanically measuring the applied tensile load and the applied releasable torque. Means are also provided for electrically sensing and mechanically recording the oscillation periods of the specimen from application of torque to damping after release.

---

Figure 1:
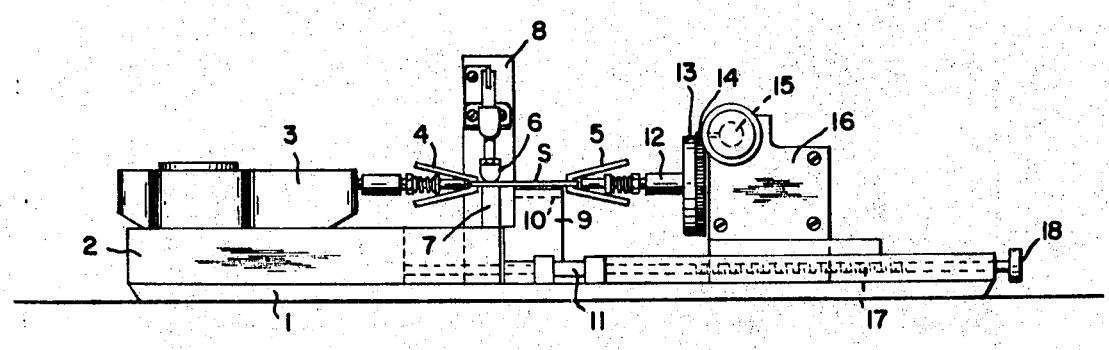

This invention relates to the testing of fabric specimens. In particular, it relates to an apparatus for measuring the tensile load that induces a minimum oscillation in a fabric specimen upon release of the specimen from twisting around a longitudinal axis. The apparatus also measures the time period required for an initial complete oscillation cycle. The invention also relates to a method of simultaneously determining resilience and stiffness of a fabric specimen.

The present invention particularly relates to the testing of non-woven fibers which are fibrous of filamentous products having a carded fiber structure or comprising fibrous mats in which the fibers or filaments are distributed haphazardly or in random array including array of fibers in a carded web wherein partial orientation is frequently present as well as other arrays in which the fibers are in a completely haphazard distributional relationship.

These bonded non-woven fibrous products are useful in the production of articles of either flat or three-dimensional shape, including insulating material and the like. Particularly the bonded fibrous products are used as textile products in articles of dress, for example, as interliners for the collars and cuffs of shirts, especially the relatively open-weave type used for summer wear.

Bonded non-woven fabrics suitable for interlinings and the like require a combination of rubbery resilience and solvent-resistance properties. Non-woven fabrics are generally evaluated by experts for resilience, bounce, softness, stiffness, harshness, etc. by wadding a piece of material in the hand and releasing it. The hand senses the resistance to crushing and feels the spring-back of the fabric when the pressure is released. The emphasis of the test is on the instantaneous reaction of the fabric. This process, however, is tedious and is influenced by subjective evaluation and is sometimes of questionable value. There has been a long-felt need in the art for quantitative procedures and apparatus for establishing absolute standards to replace these sometimes variable and, at best, approximate testing means. Development of such procedures and apparatus has not been immediately forthcoming because of the difficulty of developing dynamic mechanical tests necessary to determining the properties of non-woven fabrics that contribute to resilience particularly "snap-back from crushing."

The present invention fulfills this long-felt need and provides a method and apparatus for simultaneously determining resilience and stiffness which have been found to be respectively relatable to the tensile load that induces a minimum oscillation in a fabric specimen and the time period required for an initial oscillation cycle at this load. The present invention, although preferably applicable to the testing of non-woven fibers, is applicable to the testing of any flexible material in which stiffness and resilience are characteristic properties. The apparatus of the present invention, described in its broadest terms, comprises means for subjecting a fabric specimen to a longitudinal tensile load, means for holding an end of the specimen and means for applying a releasable torque to another end around the longitudinal axis of rotation of the specimen while the specimen is subjected to the tensile load to thereby twist the speciment through an angle of rotation, and means for measuring time period and oscillation cycles upon release of the specimen from the applied torque.

The method of the present invention, described in its broadest terms, comprises subjecting a fabric specimen to a longitudinal tensile load, twisting the specimen through an angle of rotation by applying a releasable torque load around the longitudinal axis of the specimen while the specimen is subjected to the tensile load, releasing the specimen from the applied torque to cause the specimen to oscillate around its axis of rotation and measuring the tensile load required and time for an initial complete oscillation. For purposes of this specification, an initial complete oscillation, is the first complete oscillation after release of torque where $A_1/A_2$ is between 2.5 and 3.5, preferably equal to or less than 2.7, $A_1$ and $A_2$ being respectively the amplitude of a first and second oscillation peak. This will be described in more detail infra. The ranges and values for $A_1/A_2$ above, are preferred values. The invention is useful for testing the characteristics of fiber specimens at any constant $A_1/A_2$ relationship so long as the $A_1/A_2$ ratio is such that meaningful values are obtainable.

Figure 2:
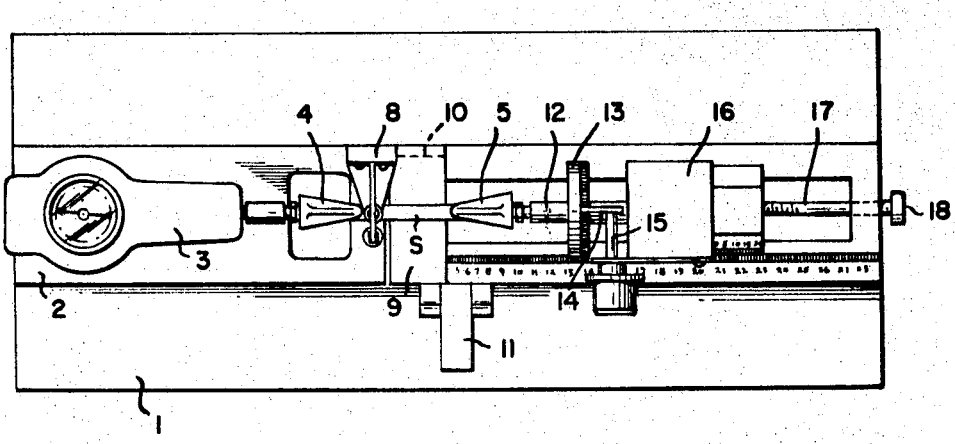
Figure 3:
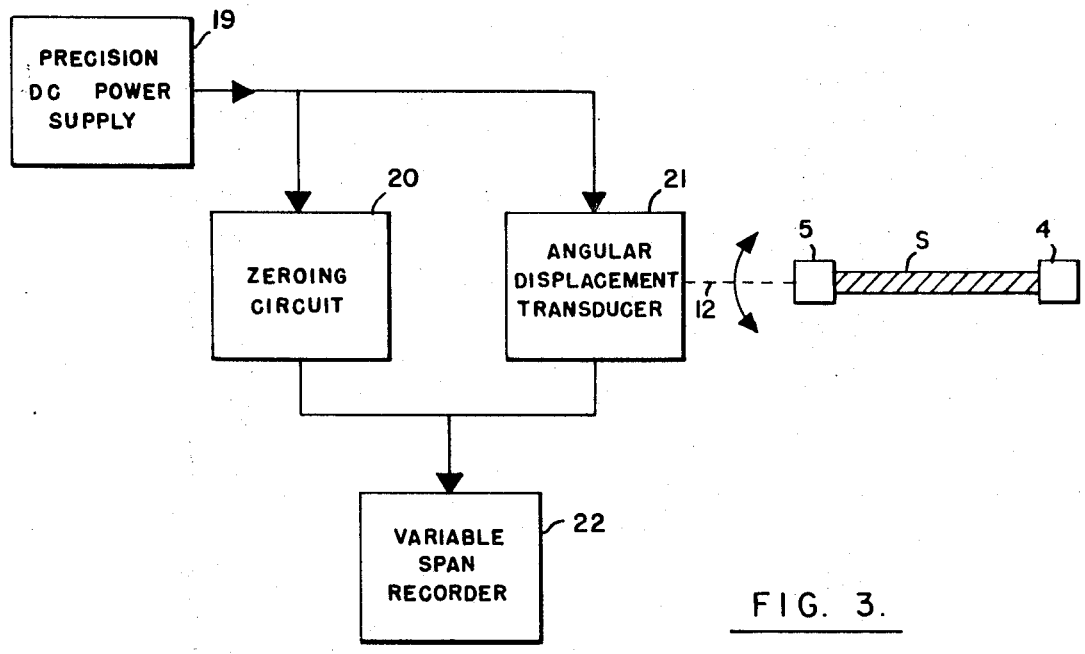
Figure 4:
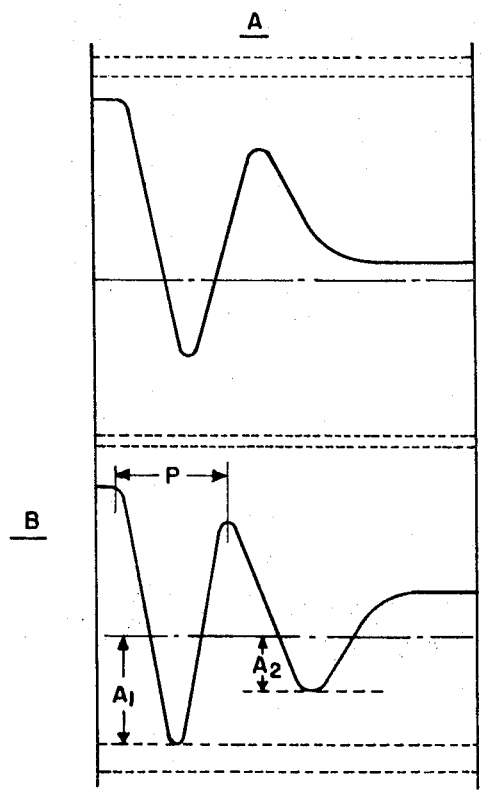

FIG. 1 of the drawings is a front elevation view of a preferred embodiment of the present invention showing the testing device and specimen to be tested.
FIG. 2 is a plan view of FIG. 1.
FIG. 3 is a functional diagram of the electronics associated with the apparatus of FIGS. 1 and 2.
FIG. 4 shows curves A and B which represent the oscillations of a fabric specimen around its longitudinal axis upon release of an applied torque.

Referring to FIGS. 1 and 2, the apparatus is set on a base 1 which supports a platform 2. A tension sensing device 3 is mounted on the platform 2. The sample being tested, designated S, is a strip of fabric which is held by means of specimen clamps 4 and 5. Specimen clamp 4 is attached to tension sensing device 3 so that the fabric sample can be subjected to a determined amount of tension which is recorded by the device 3. Once the strip has been subjected to tension, the end of the strip is clamped between lock jaw clamp 6 and stand 7 both of which are mounted on the lock jaw clamp base 8. While the strip is being mounted between the specimen clamps 4 and 5, it is supported on a raised sample leveler platform which is mounted at hinge 10. The platform 9 is supported at a horizontal position by leg 11 while the strip is mounted (not shown). After the strip has been clamped in place by jaw clamp 6, leg 11 is lowered and the platform 9 falls away from the specimen, pivoting around hinge 10 to a rest position as shown.

Clamp 5 is fixed to rotary shaft 12 and collar 13. Collar 13 is graduated for the purpose of indicating the degree of rotation around the axis of rotation of rotary shaft 12. The collar 13 is also grooved for engagement with finger 14 which is pivotally mounted at 15 on housing 16. Housing 16 additionally encompasses an angular displacement transducer (not shown) which is connected to rotary shaft 12 for purposes as will be described later. Clamp 5, rotary shaft 12 and collar 13 are slidably mounted via housing 16 on screw rail 17. The housing 16 can be longitudinally moved along rail 17 by turning knob 18 to thereby increase or decrease the tension on a specimen held between clamps 4 and 5.

In operation, a sample S is placed between clamps 4 and 5. The sample is supported and leveled by raised sample platform 9. A tension is placed on the sample by moving housing 16 and hence clamp 5, longitudinally along rail 17 away from clamp 4. Lock jaw clamp 6 is then applied to the sample to hold it in a fixed position against stand 7, and leg 11 is removed to lower leveler platform 9. Shaft 12 and collar 13 are then rotated, thereby twisting sample S to a particular angle. Finger 14 is engaged with a notch on collar 13 to hold the sample at the chosen angle of rotation. The finger 13 is then disengaged so that the sample and rotary shaft 12 are allowed to rotate freely. This free rotation develops a voltage in the connected angular displacement transducer portional to the arc of the oscillations of the shaft.

FIG. 3 is a functional diagram of the electronics associated with the apparatus of FIGS. 1 and 2. In FIG. 3, a regulated, D.C. power supply 19 provides a stable voltage source for a precision electrical bridge network composed of two precision potentiometers and their respective sliders or movable taps and indicated 20 and 21. One potentiometer 20 serves as a "zero" control to position a recorder stylus (in block 22) at 0° rotation. The other potentiometer 21 serves as an angular displacement transducer, the voltage outlet of which is directly proportional to the angle of rotation of the sample specimen S connected to the potentiometer 21 by means of clamp 5 and rotary shaft 12 (shown in FIGS. 1 and 2). The output of the electrical bridge network is measured by a variable span recorder 22 and is recorded by a stylus on a recording tape (not shown).

In principle the test specimen is the oscillating member of a torsion pendulum where one end of the specimen is rigidly clamped while the other end is attached to a moment of inertia member (rotary shaft 12 and collar 13) which is free to oscillate to twist and untwist the specimen. As discussed in Mechanical Properties of Polymers, Nielsen (1962) at pp. 141 to 143 the time required for one complete oscillation of twisting is the period P. Damping gradually converts the mechanical energy of the system into heat so that the amplitudes (indicated A in FIG. 4) of the oscillations decrease with time. Shear modulus may be calculated from the periods of the oscillations. The shorter the period the greater the modulus. The damping, expressed as the natural logarithmic decrement $\Delta$, is calculated from the rate at which the amplitude of the oscillations decreases. If the damping is high (the natural logarithmic decrement is greater than 1.0) the oscillations die out rapidly and measurements cannot be made. If the natural logarithmic decrement is equal to or less than 1.0, shear modulus for rectangular shapes is calculated as follows:

$$(1) \qquad G = \frac{5.588 \times 10^{-4} LI}{CD^3 u P^2}$$

where

G—shear modulus in pounds per square inch
L—length of specimen between clamps in inches
C—width of specimen in inches
D—thickness of specimen in inches
I—polar moment of inertia of the oscillating system
P—period of oscillation in seconds
$u$—shape factor depending on ratio of width to thickness of specimen It is preferable, in the present invention, to use test specimens of the same size within a comparative test group. With standard specimen sizes then:

$$(2) \qquad G = k(1/P^2)$$

so that $1/P^2$ indicates the relative shear modulus of the specimen and hence the stiffness. It should be noted here though that the present invention is not limited to testing of specimens of the same size but can be applied to the testing of specimens of varying size with size variations corrected to comparable shear modulus values by utilization of the above Formula 1.

Damping, the logarithmic decrement $\Delta$, is calculated from the logarithm (to the base $e$) of the ratio of two successive oscillations:

$$(3) \qquad \Delta = \ln A_1/A_2$$

where $A_1$ and $A_2$ are the amplitudes of successive oscillations of the sample as illustrated in FIG. 4. If damping is too high, $\Delta > 1.0$ then the fabric specimen is placed under a tensile load to thereby decrease the damping to obtain oscillations which can be measured. A plot of $1/P^2$ against applied tensile loads can then be extrapolated to zero to provided the correct period for determining shear modulus. Thus the minimum tensile load on a strip of fabric which will cause it to oscillate after twisting is the load at which oscillation $A_1$ divided by oscillation $A_2$ equals 2.7 (the natural logarithm of 2.7 is 1.0). Rubbery materials which recover from deformation instantaneously, oscillate under little or no tensile load. It has been found in the present invention that the fabrics rated as rubbery by experts are those which will oscillate from a rotation of 135° with 25 grams or less tensile load on a fabric strip 2 inches long by 0.5 inch wide. When tensile load is plotted against $1/P^2$ at $\Delta = 1.0$, relative positions for fabric specimens with respect to stiffness and resilience are obtained.

In the following examples, a sample 2 inches long by 0.5 inch wide is placed between the clamp of the testing device of FIGS. 1 and 2. The fabric sample is supported and leveled by a sample platform and locked into a fixed position by a lock jaw clamp. The sample platform is then removed. A tension load is placed on the sample and the shaft of the apparatus of FIGS. 1 and 2 is rotated to 135° thereby twisting the sample. The shaft is released and the shaft and sample are allowed to rotate freely. The instantaneous amplitude of the oscillations of rotations are measured by means of a recording tape. This tape is marked lengthwise in 1 mm. units, accented at 5 mm. with heavy accent at 10 mm. When the sample is at the flat, untwisted position, a stylus indicates the center line of the tape. Twisting the sample through an angle of 135° brings the stylus to the top line of the tape. The tape travels at a constant speed of 50 mm./second. Since a log decrement of 1.0 indicates high damping all measurements are taken on first oscillations. The value P (period in seconds) is taken as one complete cycle from the release point through the first low point and back to the top peak. The longitudinal distance for the first oscillation is measured in mm. and converted to seconds. The amplitudes of the first two peaks below the center line are measured and the logarithmic decrement $\Delta$ is calculated from the logarithm (to the base $e$) of the ratio of the amplitudes of the two successive oscillations. As given in Formula 3 $\Delta = \ln A_1/A_2$ where $A_1$ is the amplitude of the first oscillation and $A_2$ is the amplitude of the second oscillation.

Even the most resilient fabrics have relatively high damping (as compared to a steel spring) and some tensile load is generally necessary to obtain two complete oscillations that have sufficient amplitude to be measured. The critical amplitudes selected are those giving a log decrement $\Delta = 1.0$ or lower. The tensile load and shear modulus $1/P^2$ at these critical amplitudes are characteristic of a fabric specimen. Since tensile load is inversely related to resilience and shear modulus is stiffness, the two qualities (stiffness and resilience) are quantitatively determined and related among fabrics.

In comparing different materials for relative stiffness are given to the panel. A minimum of four test strips are cut from different pads.

The samples are prepared by padding a cross laid non-woven polyester web weighing 1 oz. per square yard with a 10% solids solution of the formulated polymer emulsions indicated in Table 1. The padded webs are supported on glass marquisette, partially dried under infrared, air-dried overnight, cured for 5 minutes at 150° C., calendered at normal roll pressure, and conditioned for a minimum of 16 hours at 65% R.H., 70° F.

TABLE 1

| Fabric specimen | Binder composition | Additive |
|---|---|---|
| 2 | Copolymer of 86 parts ethyl acrylate, 10 parts acrylonitrile and 4 parts of a molar mixture of acrylamide and methylolacrylamide. | None. |
| 3 | Copolymer of 60 parts butadiene, 37 parts acrylonitrile and 3 parts methacrylic acid. | 5% of a melamine formaldehyde resin emulsion. |
| 4 | Copolymer of 96 parts butyl acrylate and 4 parts of a 1 to 1 molar mixture of methylacrylamide and methylol methacrylamide. | Do. |
| 5 | 96 parts butyl acrylate, 3.5 parts N-methylol-4-pentenlguanamine, and 0.5 part acrylic acid. | 1% of a melamine formaldehyde resin emulsion. |
| 6 | Copolymer of 96 parts butyl acrylate, 3.5 parts N-methylol-4-pentenoguanamine, and 0.5 part acrylic acid. | 5% of a polyvinyl chloride resin emulsion. |
| 7 | Copolymer of 96 parts butyl acrylate, 4 parts of a 1:1 molar mixture of methylacrylamide and methylol methacrylamide. | 10% of a polyvinyl chloride resin emulsion. |
| 8 | Ethyl acrylate polymer | 5% of a polyvinyl chloride resin emulsion and 5% of a 50% solids emulsion of 96.0 parts butyl acrylate, 3.5 parts N-methylol-4-pentenoguanamine and 5 parts acrylic acid. |
| 9 | do | 2.5% of a polyvinyl chloride resin emulsion and 2.5% of a 50% solids emulsion of 96.0 parts butyl acrylate, 3.5 parts N-methylol-4-pentenoguanamine and 0.5 part acrylic acid. | and resilience, the samples are tested at different tensile loads, increased in determined increments until the tensile load is sufficient to cause the sample to oscillate in arcs in which $A_1/A_2$ is equal to or less than 2.7 or $\Delta$ is equal to or less than 1. This tensile load is characteristic of the sample and readings at this load are used to calculate the stiffness and resilience.

EXAMPLE 1

In this example, the test sample is a 0.5 by 2.0 inch rectangular strip of an interlining used for shape recovery in clothes and made from a non-woven polyester fabric bonded together by resins of butadiene-acrylonitrile formulated with triazine formaldehyde.

After clamping the piece into the testing device, an initial load of 5 grams is applied and the piece is twisted through an angle of 135°. The test specimen is then allowed to rotate freely from the initial torque of applied amplitude of 135°. The curve shown in FIG. 4, A, representing the oscillation of the sample around its longitudinal axis upon release of the applied torque is obtained. It is seen that a load of 5 grams is not enough to give two oscillations for this particular sample.

An increased load of 25 grams is applied and the sample is twisted through an angle of 135°. The applied torque is released and the sample is allowed to rotate freely and the curve shown in FIG. 4, B is obtained. From this curve, it is seen that a tensile load of 25 grams is sufficient to give a value $A_1/A_2 = 1.78$ the natural log of which is 0.576 which is less than 1. The period from FIG. 4, B, is $$P = \frac{13\text{mm.}}{50\text{mm./sec.}}$$

or 0.26 second and $1/P^2 = 15.0$.

The resilience of this sample is determined to be "FAST" by a panel of experts and the hand to be borderline between soft and firm. Thus the determination of the decrement of oscillation to be less than 2.0 with a 25 gram tensile load, correlates this tensile load with a fast resilience and the $1/P^2$ value of 15.0 is correlated with a hand between soft and firm.

EXAMPLES 2 TO 9

In the following examples, measurements are made on the fabrics by the procedure of Example 1, and these measurements are correlated with evaluation of the same fabrics by a panel of four experts. Whenever possible in these examples, the strips of fabric used as test specimens in the testing device are cut from the same pieces of fabric that In the panelists' determinations, each expert is asked to rate the fabrics for resilience as "fast," "medium" and "slow" and to rate the hand as "soft," "firm" or "stiff." Each panelist is advised that specimen 3 is to be considered "firm" with fast recovery. Specimen 3 is considered a reference material and all other fabrics are rated against its standard.

Results of both the panel evaluations and testings of the fabrics by the apparatus and process of the present invention (as detailed in the specification above and in Example 1) are given in Table 2. The tensile loads are determined in 5 gram increments below 25 and in 25 gram increments above 25 and are those lowest loads which give an $A_1/A_2 \leqq 2.7$.

TABLE 2

| | Resilience | | Stiffness | |
|---|---|---|---|---|
| Specimen | Tensile load (grams) | Panel | Period $1/P^2$ | Panel |
| 2 | 200 | Slow | 35 | Firm to stiff. |
| 3 | 5 | Fast | 20 | Firm. |
| 4 | 5 | do | 11 | Soft. |
| 5 | 25 | Medium-fast | 18 | Soft to firm (softer than 3). |
| 6 | 5 | Fast | 29 | Stiffer than 3. |
| 7 | 5 | do | 16 | Softer than 3. |
| 8 | 50 | Medium | 17 | Soft to firm (softer than 3). |
| 9 | 50 | do | 20 | Do. |

These examples illustrate the correlation between resilience and stiffness as determined by the process and apparatus of the present invention and with previously used subjective testing methods. Generally the following correlations shown in Table 3 are indicated.

TABLE 3

Resilience

| Tensile load, grams | Resilence |
|---|---|
| 1–30 | Fast recovery. |
| 20–100 | Medium recovery. |
| >100 | Slow recovery. |

Stiffness

| Tensile load, grams | $1/P^2$ | Stiffness |
|---|---|---|
| 5 | 1–15 | Soft. |
| 5 | 15–30 | Medium. |
| 5 | >30 | Stiff. |
| 200 | 1–25 | Soft. |
| 200 | 25–40 | Medium. |
| 200 | >30 | Stiff. |

The values indicated in Table 3 illustrate the usefulness of the process and apparatus of the present invention for determining resilience and stiffness of fabric specimens. The process and apparatus of the present invention are particularly useful for determining relative resilience and stiffness for a series of fabric specimens.

What is claimed is:

1. An apparatus for measuring the tensile load that induces a minimum oscillation in a fabric specimen and the time required for an initial complete oscillation cycle comprising means for subjecting the fabric specimen to a longitudinal tensile load, and means for measuring said load applied to the specimen, means for holding an end of the specimen and means for applying a releasable torque to another end around the longitudinal axis of rotation of the specimen while the specimen is subjected to the tensile load to thereby twist the specimen through an angle of rotation, and means for measuring time period and oscillation cycles upon release of the specimen from the applied torque.

2. The apparatus of claim 1 additionally comprising means for recording and representing the measured time period and oscillation cycles.

3. A method of simultaneously determining resilience and stiffness of a fabric specimen comprising subjecting the specimen to a longitudinal tensile load, twisting the specimen through an angle of rotation by applying a releasable torque load around the longitudinal axis of the specimen while the specimen is subjected to the tensile load, releasing the specimen from the applied torque to cause the specimen to oscillate around its axis of rotation, and measuring the tensile load required and the time for an initial complete oscillation.

4. The process of claim 3 in which an initial oscillation is that oscillation at which $A_1/A_2$ is between 2.5 and 3.5 where $A_1$ and $A_2$ are respectively the amplitudes of successive complete oscillations of the specimen.

5. The process of claim 3 in which the initial oscillation is that oscillation at which $A_1/A_2$ is equal to or less than 2.7 at a maximum tensile load.

References Cited
UNITED STATES PATENTS

| | | | |
|---|---|---|---|
| 2,593,389 | 4/1952 | Nielsen | 73—99 |
| 3,313,148 | 4/1967 | Dautreppe et al. | 73—99 |

JERRY W. MYRACLE, Primary Examiner

U.S. Cl. X.R.

73—159